United States Patent
Kulshrestha et al.

(10) Patent No.: US 10,748,364 B1
(45) Date of Patent: Aug. 18, 2020

(54) METHODS AND SYSTEMS FOR ACCESS CONTROL

(71) Applicant: Sensormatic Electronics, LLC, Boca Raton, FL (US)

(72) Inventors: Himanshu Kulshrestha, Agra (IN); Kuldeep Sharma, Gurugram (IN); Pawan Sharma, Gurgaon (IN); Mohd Arif, Saharanpur (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/513,286

(22) Filed: Jul. 16, 2019

(51) Int. Cl.
  *G07C 9/27* (2020.01)
  *H04W 60/06* (2009.01)
  *G07C 9/00* (2020.01)

(52) U.S. Cl.
  CPC ........... *G07C 9/27* (2020.01); *G07C 9/00571* (2013.01); *H04W 60/06* (2013.01); *G07C 2209/02* (2013.01)

(58) Field of Classification Search
  CPC ...... G07C 9/27; G07C 9/00571; H04W 60/06
  See application file for complete search history.

(56) References Cited

U.S. PATENT DOCUMENTS

2002/0174336 A1* 11/2002 Sakakibara ............ G07C 9/257
   713/172

* cited by examiner

*Primary Examiner* — Curtis B Odom
(74) *Attorney, Agent, or Firm* — Arent Fox LLP

(57) ABSTRACT

Aspects of the present disclosure include methods, apparatuses, and computer readable media for controlling access including receiving registration information associating a mobile device with an access device, wherein the access device provides an access privilege to an access-controlled point, associating the mobile device with the access device, receiving a blocking request from the mobile device to suspend the access privilege to the access-controlled point provided by the access device, authenticating the blocking request, and suspending, in response to authenticating the blocking request, the access privilege to the access-controlled point provided by the access device. In another aspect, methods, apparatuses, and computer readable media for controlling access may include receiving an unblocking request from the mobile device to restore the access privilege to the access-controlled point, authenticating the unblocking request, restoring, in response to authenticating the unblocking request, the access privilege to the access-controlled point provided by the access device.

20 Claims, 6 Drawing Sheets

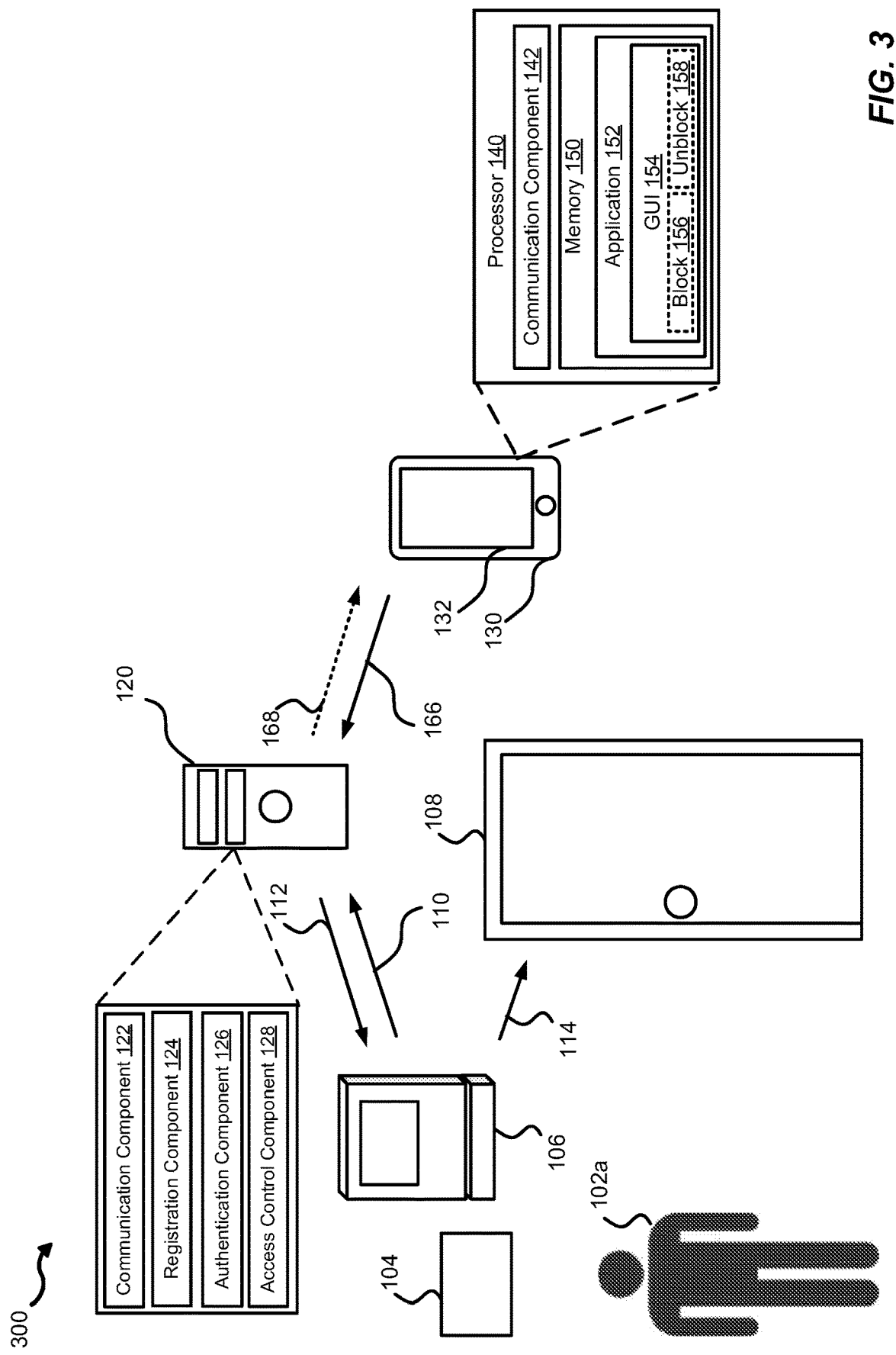

METHODS AND SYSTEMS FOR ACCESS CONTROL

BACKGROUND

Infrastructures (e.g., buildings, plants, warehouses, laboratories) and/or assets (e.g., safe-deposit boxes, computer devices) may utilize one or more access-controlled points (e.g., a door that requires an access card to enter) to prevent unauthorized personnel from accessing the infrastructures and/or assets. An authorized personnel may rely on an access card to enter into an access-controlled infrastructure/asset. However, the access card may be misplaced or stolen. If the authorized personnel loses the access card, it may be important to promptly notify security personnel (e.g., on premise security, network administrator) to prevent unauthorized personnel from gaining access to the access-controlled infrastructure/asset. If the security personnel is promptly notified, appropriate measures (e.g., revoke the access privilege of the access card) may be taken before any unauthorized personnel has an opportunity to access the access-controlled infrastructure/asset. However, if the access card is misplaced or stolen when the security personnel is unavailable or unreachable (e.g., over the weekends, during a holiday, in the middle of the night), it may take hours or days before the appropriate measures can be taken, which provides a vulnerable time to the unauthorized personnel. Therefore, improvements in access control may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Certain aspects of the present disclosure includes a method for controlling access including receiving registration information associating a mobile device with an access device, wherein the access device provides an access privilege to an access-controlled point, associating the mobile device with the access device, receiving a blocking request from the mobile device to suspend the access privilege to the access-controlled point provided by the access device, authenticating the blocking request, and suspending, in response to authenticating the blocking request, the access privilege to the access-controlled point provided by the access device.

Some aspects of the present disclosure includes a security server having a memory that stores instructions and a processor configured to execute the instructions to perform the steps of receiving registration information associating a mobile device with an access device, wherein the access device provides an access privilege to an access-controlled point, associating the mobile device with the access device, receiving a blocking request from the mobile device to suspend the access privilege to the access-controlled point provided by the access device, authenticating the blocking request, and suspending, in response to authenticating the blocking request, the access privilege to the access-controlled point provided by the access device.

An aspect of the present disclosure includes a non-transitory computer readable medium having instructions that, when executed by a processor, cause the process to perform the steps of receiving registration information associating a mobile device with an access device, wherein the access device provides an access privilege to an access-controlled point, associating the mobile device with the access device, receiving a blocking request from the mobile device to suspend the access privilege to the access-controlled point provided by the access device, authenticating the blocking request, and suspending, in response to authenticating the blocking request, the access privilege to the access-controlled point provided by the access device

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

FIG. 3 illustrates an example of an environment for restoring access privilege to the access-controlled point in accordance with aspects of the present disclosure;

DETAILED DESCRIPTION

In some aspects of the present disclosure, an access card holder may have an access card used to enter an access-controlled building. For example, the access card holder may swipe the access card in a scanner to gain, after verifying the access card, access to the building. The access card holder may register a mobile device with a security system. The security system may associate the mobile device with the access card belonging to the access card holder. When the access card holder loses the access card, the access card holder may use the mobile device to transmit a blocking request to the security system. Upon receiving the blocking request from the mobile device associated with the access card, the security system may revoke the access privilege of the access card. If the access card holder locates the access card, he/she may transmit an unblocking request to the security system. Upon receiving the unblocking request from the mobile device associated with the access card, the security system may resume the access privilege of the access card.

Aspects of the present disclosure may obviate the need to contact an administrator after misplacing the access card. The access card holder may utilize a registered mobile device to suspending the access privilege of the access card.

Another aspect of the present disclosure includes increased security when the access card holder misplaces the access card. By revoking the access privilege of the access card via the registered mobile phone, the access card holder may prevent unauthorized card holders from misusing the access card without the need to wait for the administrator to revoke the access privilege of the access card.

Figure 1:
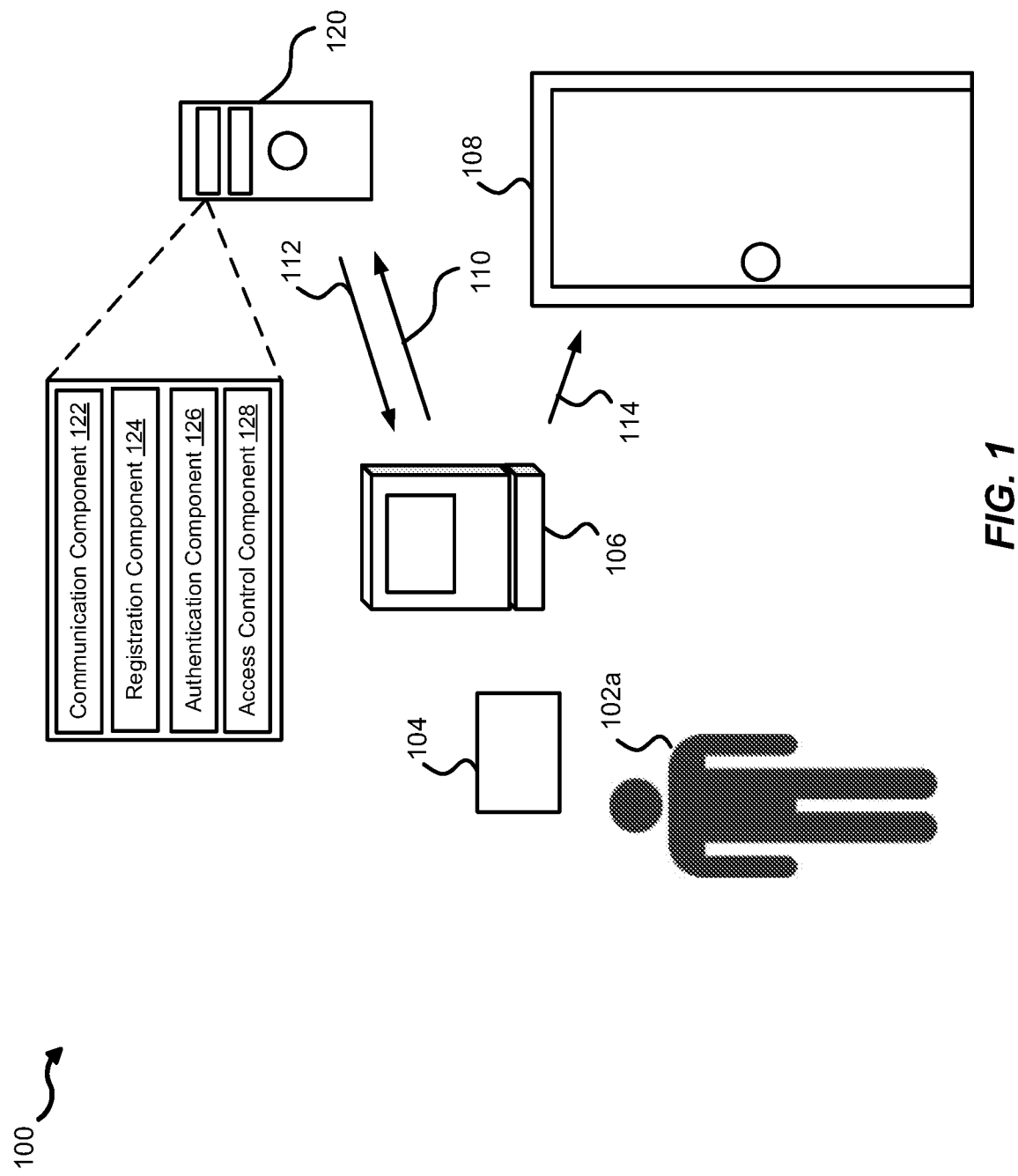
FIG. 1 illustrates an example of an environment for accessing an access-controlled point in accordance with aspects of the present disclosure.

Turning now to FIG. 1, in certain non-limiting examples, an environment 100 for controlling access may include an authorized card holder 102a that may utilize an access device 104 to gain access to an access-controlled point 108. The access device 104 may include at least one or more of a magnetic strip, a radio frequency identification (RFID) tag, or other instruments that store access information. The access-controlled point 108 may be a door/vault that requires an access card to enter or a computer account that requires a password to use. The access-controlled point 108 may be utilized to control access to infrastructures (e.g., buildings, plants, warehouses, laboratories) and/or assets (e.g., safe-deposit boxes, computer devices).

In an aspect, the environment 100 may include a scanner 106 that receives access information from the access device 104. The environment 100 may include a security server 120. The security server 120 may include a communication component 122 that receives access information and/or transmits access grant. The security server 120 may include a registration component 124 that associates a mobile phone 130 to an access device 104. The security server 120 may include an authentication component 126 that authenticates an access request. The security server 120 may include an access control component 128 that blocks or unblocks access privileges of an access device.

During operations, in some implementations, the authorized card holder 102a may present the access device 104 to a scanner 106. The scanner 106 may receive access information from the access device 104. In certain aspects, the scanner 106 may include a RFID reader that reads the access information in a RFID tag in the access device 104. In other aspects, the scanner 106 may include a magnetic scanner that scan a magnetic strip in the access device 104 to obtain the access information embedded in the magnetic strip. The access information may indicate that the access device 104 includes sufficient access privilege to access the access-controlled point 108. For example, the access information may include one or more of an identity of the authorized card holder 102a, an identification associated with the access device 104, one or more access-controlled points (such as the access-controlled point 108) that an holder (e.g., the authorized card holder 102a) of the access device 104 may access, or other information relevant in determining the access privilege associated with the access device 104.

In some implementations, after obtaining the access information from the access device 104, the scanner 106 may transmit an access request 110 to the security server. The access request 110 may include at least a portion of the access information. The scanner 106 may transmit the access request 110 via a wired or wireless connection to the security server 120. Upon receiving the access request 110, the security server 120 may authenticate the access request 110. For example, the security server 120 may determine, based on the access information transmitted by the scanner 106, whether to grant the authorized card holder 102a access to the access-controlled point 108.

In some implementations, in response to determining that the access device 104 includes sufficient privilege to access the access-controlled point 108, the security server 120 may transmit an access grant 112 to the scanner 106. The access grant 112 may indicate to the scanner 106 that the access device 104 includes sufficient privilege to access the access-controlled point 108. In response to receiving the access grant 112 from the security server 120, the scanner 106 may transmit an access signal 114 to the access-controlled point 108 to grant access to the authorized card holder 102a. In some examples, a security personnel may authorize the access after receiving the access grant.

Figure 2:
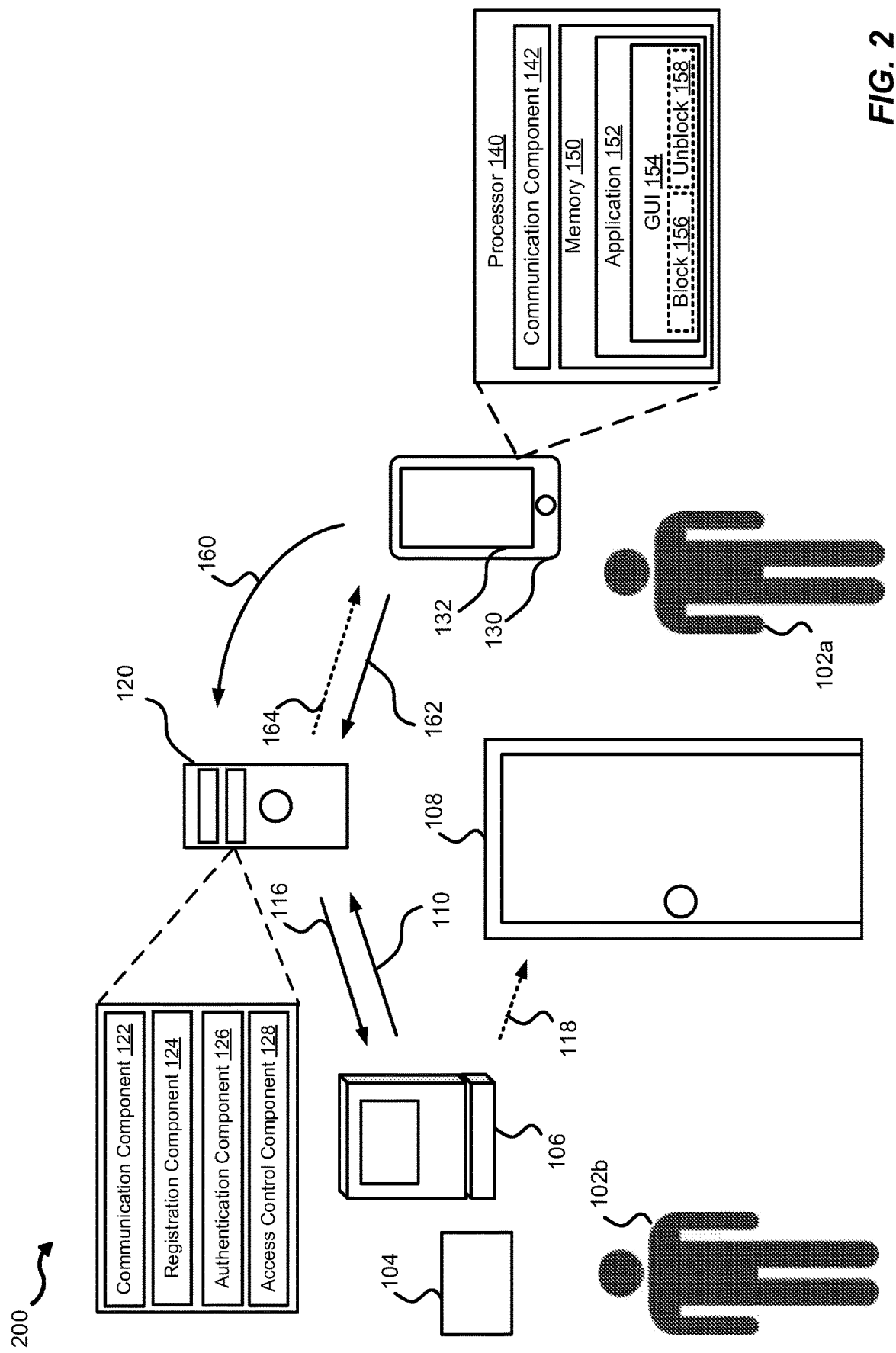
FIG. 2 illustrates an example of an environment for controlling access to the access-controlled point in accordance with aspects of the present disclosure.

Referring now to FIG. 2 and referencing FIG. 1, in some implementations, another example of an environment 200 for controlling access may include the authorized card holder 102a, the access device 104, the scanner 106, and the scanner 120 as described with respect to FIG. 1. The environment 200 may include a mobile device 130 associated with the authorized card holder 102a. The mobile device 130 may include a processor 140 and a memory 150. The processor 140 may include a communication component 142 configured to transmit a blocking and/or unblocking signals. The communication component 142 may be optionally configured to receive one or more confirmation signals. The memory 150 may include instructions for an application 152 that, when executed by the processor 140, cause the application 152 to provide a graphical user interface (GUI) 154 onto a display 132 of the mobile device 130. The GUI 154 may optionally include a block control 156 and/or an unblock control 158. The environment 200 may include an unauthorized card holder 102b.

During operations, the authorized card holder 102a may register the mobile device 130 with the security server 120. During the registration process of the mobile device 130, the communication component 142 of the mobile device 130 may transmit a registration message 160 (e.g., a message via the application 152, a short message service (SMS) message, an electronic mail (email), a multimedia message server (MMS) message) or other messages to the security server 120. In response to receiving the registration message 160, the security server 120 may register, via the registration component 124 of the security server 120, the mobile device 130 by associating the mobile device 130 with at least one of the authorized card holder 120a or the access device 104. The registration message 160 may optionally include information relating to the mobile device 130, such as a hardware identification (e.g., medium access control address) of the mobile device 130. In other examples, the authorized card holder 102a may register the mobile device 130 by providing the information relating to the mobile device 130 to one or more system administrators of the security server 120 to implement the registration of the mobile device 130. The information relating to the mobile device 130 may include hardware identification, phone number of the mobile device 130, subscriber identity module (SIM) number of the mobile device 130, or other identifiers associated with the mobile device 130.

In certain instances, the security server 120 may include one or more serial ports and/or one or more modems (e.g., communication interface 524) configured to communicate via the Global System for Mobile Communication (GSM) standard. The security server 120 may rely on an access control service to monitor the one or more serial ports for the received SMS by the one or more GSM modems using Attention (AT) commands and identifies the SMS as valid SMS to block the access card of personnel registered. The security server 120 may obtain the personnel information from registered phone number and update the information necessary to block/unblock the access device 104.

In some examples, after registering the mobile device 130, the authorized card holder 102a may misplace or compromise the access device 104. In one non-limiting example, the authorized card holder 102a may lose an access card used to access an access-controlled building. In another example, the authorized card holder 102a may disclose a password to an access-controlled computer. Due to the misplacement or compromising of the access device 104, the unauthorized card holder 102b may possess the access device 104. For example, the unauthorized card holder 102b may find the access card that the authorized card holder 102a lost. Alternatively, the unauthorized card holder 102b may know the password to the access-controlled computer.

In some circumstances, in response to misplacing and/or compromising the access device 104, the authorized card holder 102a may utilize the communication component 142 of the mobile device 130 to transmit a blocking request 162 to the security server 120. The blocking request 162 may include information identifying the mobile device 130, such as the hardware identification. The blocking request 162 may indicate to the security server 120 that the authorized card holder 102a requests the access privilege of the access device 104 to be suspended.

In response to receiving the blocking request 162, the security server 120 may authenticate, via authentication component 126, the blocking request 162. The authentication process may include the security server 120 confirming the identity of the sender that transmitted the blocking request 162. Upon completing the authentication process, the security server 120 may suspend, via the access control component 128, the access privilege of the access device 104.

In optional implementations, the security server 120 may transmit a blocking confirmation message 164 confirming the suspension of the access privilege of the access device 104.

In one aspect of the present disclosure, the authorized card holder 102a may misplace the access device 104 (e.g., lose an access card). In response to misplacing the access device 104, the authorized card holder 102a may utilize the mobile device 130 to transmit the blocking request 162 to the security server 120. The authorized card holder 102a may transmit the blocking request 162 via the application 152. For example, the authorized card holder 102a may activate the application 152 and select the block control 156 in the GUI 154. In response to the authorized card holder 102a selecting the block control 156, the communication component 142 of the mobile device 130 may transmit the blocking request 162 to the security server 120. In other words, the blocking request 162 may be transmitted to the security server 120 without the authorized card holder 102a remembering and/or entering any phone number, format, content, or other information necessary to notify the security server 120. The application 152 may include the information necessary and generate the blocking request 162 after the selection of the block control 156 in the GUI 154.

In another example, the communication component 142 of the mobile device 130 may transmit a message (e.g., SMS, MMS, email, etc.) including the blocking request 162 to the security server 120.

In some implementations, in response to receiving the blocking request 162, the security server 120 may suspend the access privilege of the access device 104.

In certain aspects, after the suspension of the access privilege of the access device 104, the unauthorized card holder 102b may present the access device 104 to the scanner 106. The scanner 106 may receive access information from the access device 104. After obtaining the access information from the access device 104, the scanner 106 may transmit the access request 110 to the security server. The access request 110 may include at least a portion of the access information.

In certain examples, upon receiving the access request 110, the security server 120 may authenticate the access request 110. Due to the suspension of the access privilege of the access device 104, the security server 120 may deny the unauthorized card holder 102b access to the access-controlled point 108.

In some implementations, in response to the suspension of the access privilege of the access device 104, the security server 120 may transmit an access deny 116 to the scanner 106. In response to receiving the access deny 116 from the security server 120, the scanner 106 may optionally transmit a deny signal 118 to the access-controlled point 108 to deny access to the unauthorized card holder 102b. In other instances, the scanner 106 may not transmit any signal to the access-controlled point 108, and the access-controlled point 108 continues to deny access to the unauthorized card holder 102b.

In optional implementations, in response to the suspension of the access privilege of the access device 104 and the reception of the access request 110, the security server 120 may transmit an alert signal to security personnel (e.g., security guards, police officers, law enforcement officers, etc.) associated with the access-controlled point 108. The alert signal may indicate an unauthorized attempt to access the access-controlled point 108.

Turning now to FIG. 3, in some implementations, the authorized card holder 102a may recover the access device 104 (e.g., found the misplaced access card). The authorized card holder 102a may restore the access privilege of the access device 104 via the mobile device 130. For example, after recovering the access device 104, the authorized card holder 102a may activate the application 152 and select the unblock control 158 in the GUI 154. In response to the authorized card holder 102a selecting the block control 156, the communication component 142 of the mobile device 130 may transmit an unblocking request 166 to the security server 120. In other words, the unblocking request 166 may be transmitted to the security server 120 without the authorized card holder 102a remembering and/or entering any phone number, format, content, or other information necessary to notify the security server 120. The application 152 may include the information necessary and generate the unblocking request 166 after the selection of the block control 156 in the GUI 154.

In another example, the communication component 142 of the mobile device 130 may transmit a message (e.g., SMS, MMS, email, etc.) including the unblocking request 166 to the security server 120.

In some implementations, the communication component 142 of the may transmit the unblocking request 166 to the security server 120. In response to receiving the unblocking request 166, the security server 120 may authenticate, via the authentication component 126, the unblocking request 166. The authentication process may include the security server 120 confirming the identity of the sender that transmitted the unblocking request 166. Upon completing the authentication process, the security server 120 may restore, via the access control component 128, the access privilege of the access device 104.

In optional implementations, the security server 120 may transmit an unblocking confirmation message 168 confirming the restoration of the access privilege of the access device 104.

In certain aspects, after the restoration of the access privilege of the access device 104, the authorized card holder 102*a* may present the access device 104 to the scanner 106. The scanner 106 may receive access information from the access device 104. After obtaining the access information from the access device 104, the scanner 106 may transmit the access request 110 to the security server. The access request 110 may include at least a portion of the access information.

In certain examples, upon receiving the access request 110, the security server 120 may authenticate the access request 110. Due to the restoration of the access privilege of the access device 104, the security server 120 may grant the authorized card holder 102*a* access to the access-controlled point 108.

In some implementations, in response to the restoration of the access privilege of the access device 104, the security server 120 may transmit the access grant 112 to the scanner 106. In response to receiving the access grant 112 from the security server 120, the scanner 106 may transmit the grant signal 114 to the access-controlled point 108 to grant access to the authorized card holder 102*a*.

Figure 4A:
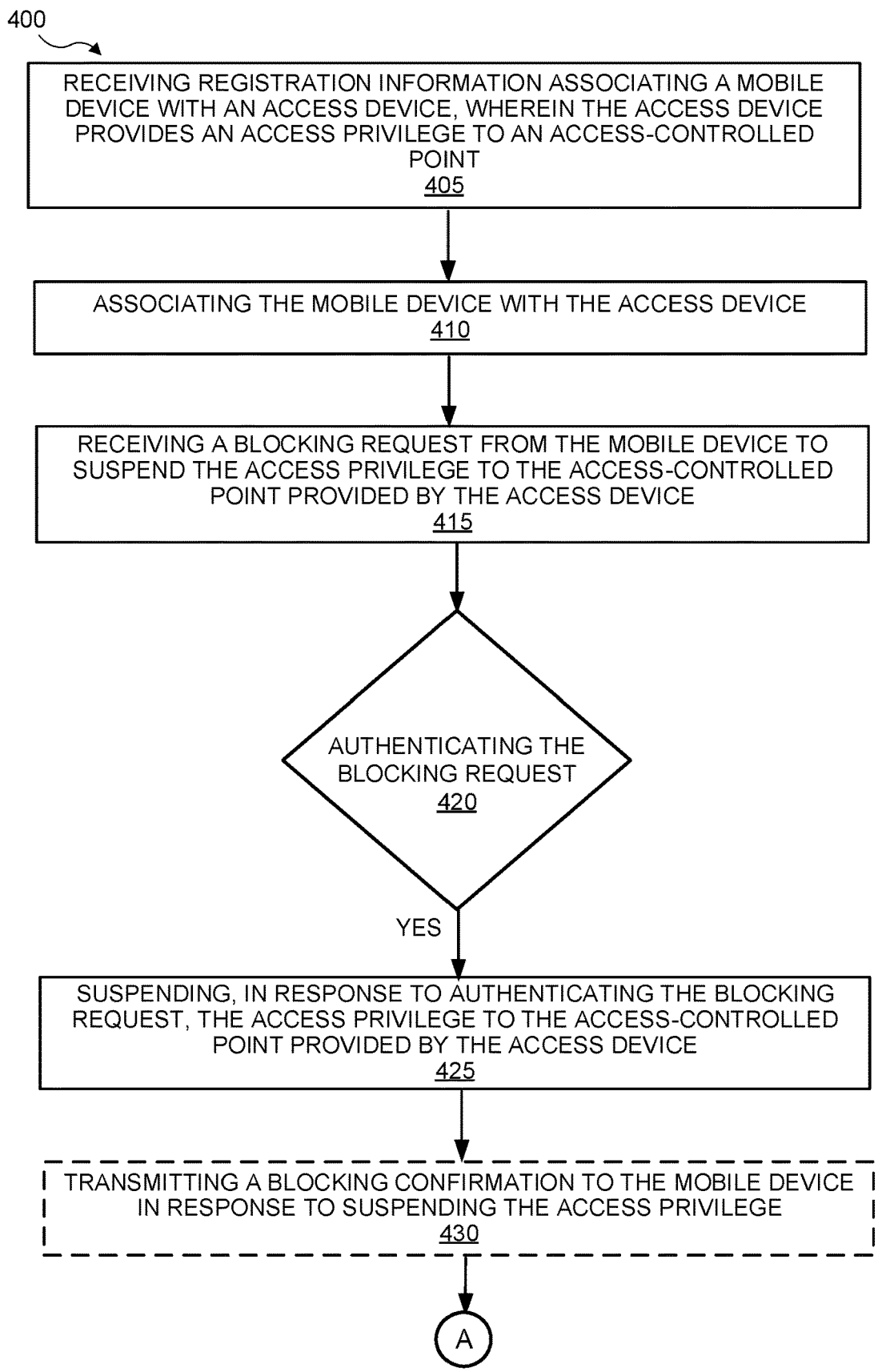
FIG. 4A illustrates an example of a method for controlling access in accordance with aspects of the present disclosure.
Figure 4B:
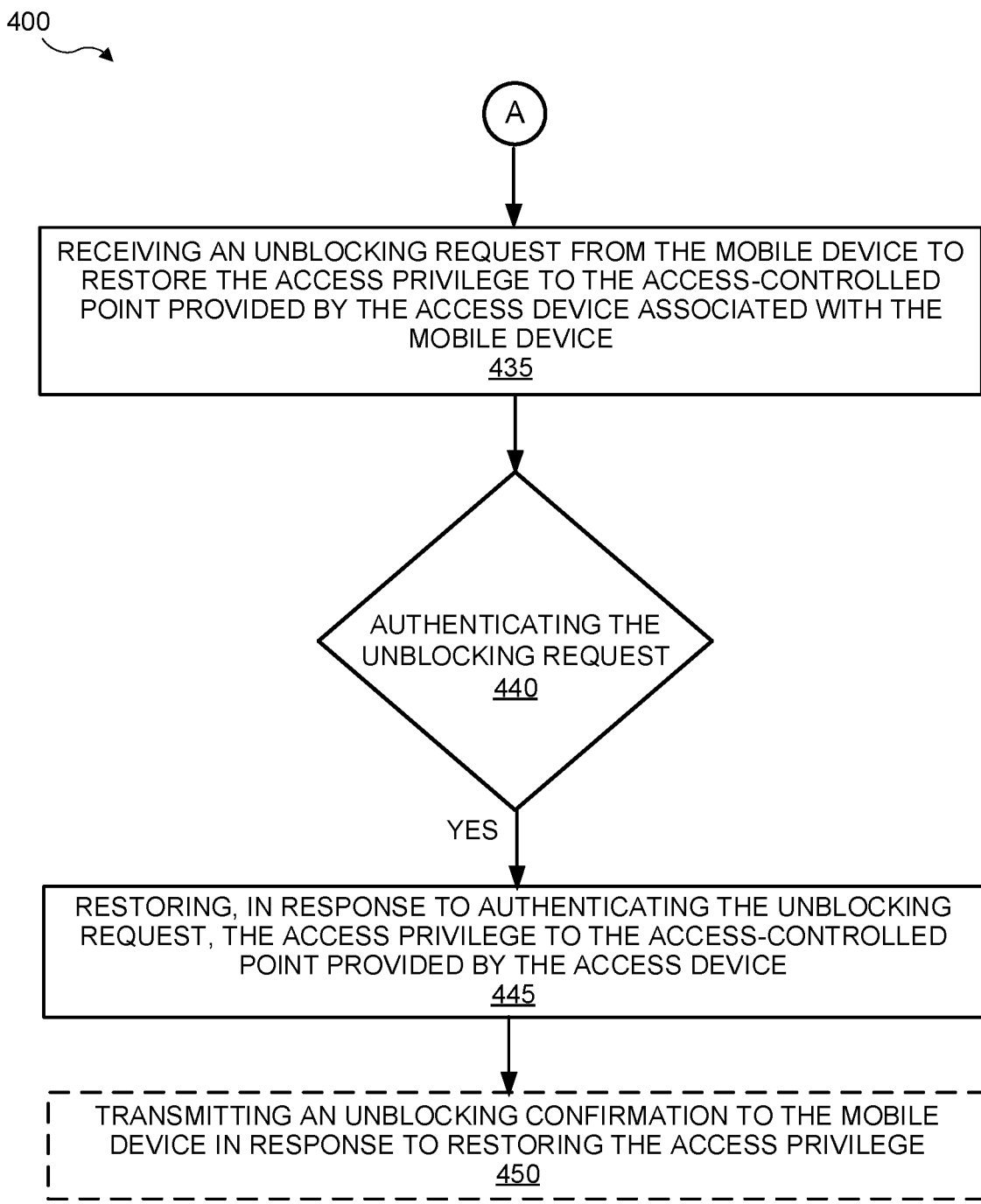
FIG. 4B illustrates an example of a method for restoring access privilege in accordance with aspects of the present disclosure.

Referring to FIGS. 4A-B, an example of a method 400 for controlling access may be performed by the communication component 122, the registration component 124, the authentication component 126, the access control component 128 and/or the security server 120.

At block 405, the method 400 may receive registration information associating a mobile device with an access device, wherein the access device provides an access privilege to an access-controlled point. For example, the communication component 122 of the security server 120 may receive the registration message 160 (e.g., a message via the application 152, a short message service (SMS) message, an electronic mail (email), a multimedia message server (MMS) message, or other messages). The registration message 160 may optionally include information relating to the mobile device 130, such as a hardware identification (e.g., medium access control address) of the mobile device 130.

At block 410, the method 400 may associate the mobile device with the access device. For example, the registration component 124 of the security server 120 may associate the mobile device 130 with the access device 104.

At block 415, the method 400 may receive a blocking request from the mobile device to suspend the access privilege to the access-controlled point provided by the access device. For example, the communication component 122 of the security server 120 may receive the blocking request 162 from the mobile device 130 to suspend the access privilege of the access device 104 to the access-controlled point 108. The blocking request 162 may be sent as a SMS message, a MMS message, an email, or other formats. The block request 162 may be sent in response to the authorized card holder 102*a* selecting the block control 156 via the GUI 154.

At block 420, the method 400 may authenticate the blocking request. For example, the authentication component 126 may authenticate the blocking request 162 by verifying that the mobile device 130 is associated with the access device 104.

At block 425, the method 400 may suspend, in response to authenticating the blocking request, the access privilege to the access-controlled point provided by the access device. For example, the access control component 128 may suspend, in response to authenticating the blocking request 162, the access privilege to the access-controlled point 108 provided by the access device 104.

At block 430, the method 400 may optionally transmit a blocking confirmation to the mobile device in response to suspending the access privilege. For example, the communication component 122 may transmit the blocking confirmation message 164 to the mobile device 130 indicating the suspension of the access privilege of the access device 104.

At block 435, the method 400 may receive an unblocking request from the mobile device to restore the access privilege to the access-controlled point provided by the access device associated with the mobile device. For example, the communication component 122 of the security server 120 may receive the unblocking request 166 from the mobile device 130. For example, after recovering the access device 104, the authorized card holder 102*a* may activate the application 152 and select the unblock control 158 in the GUI 154. In response to the authorized card holder 102*a* selecting the block control 156, the communication component 142 of the mobile device 130 may transmit an unblocking request 166 to the security server 120. In another example, the communication component 142 of the mobile device 130 may transmit a message (e.g., SMS, MMS, email, etc.) including the unblocking request 166 to the security server 120.

At block 440, the method 400 may authenticate the unblocking request. For example, the authentication component 126 may authenticate the unblocking request 166 by verifying that the mobile device 130 is associated with the access device 104.

At block 445, the method 400 may restore, in response to authenticating the unblocking request, the access privilege to the access-controlled point provided by the access device. For example, the access control component 128 may restore, in response to authenticating the unblocking request 162, the access privilege to the access-controlled point 108 provided by the access device 104.

At block 450, the method 400 may optionally transmit an unblocking confirmation to the mobile device in response to restoring the access privilege. For example, the communication component 122 may transmit the unblocking confirmation message 168 to the mobile device 130 indicating the restoration of the access privilege of the access device 104.

Figure 5:
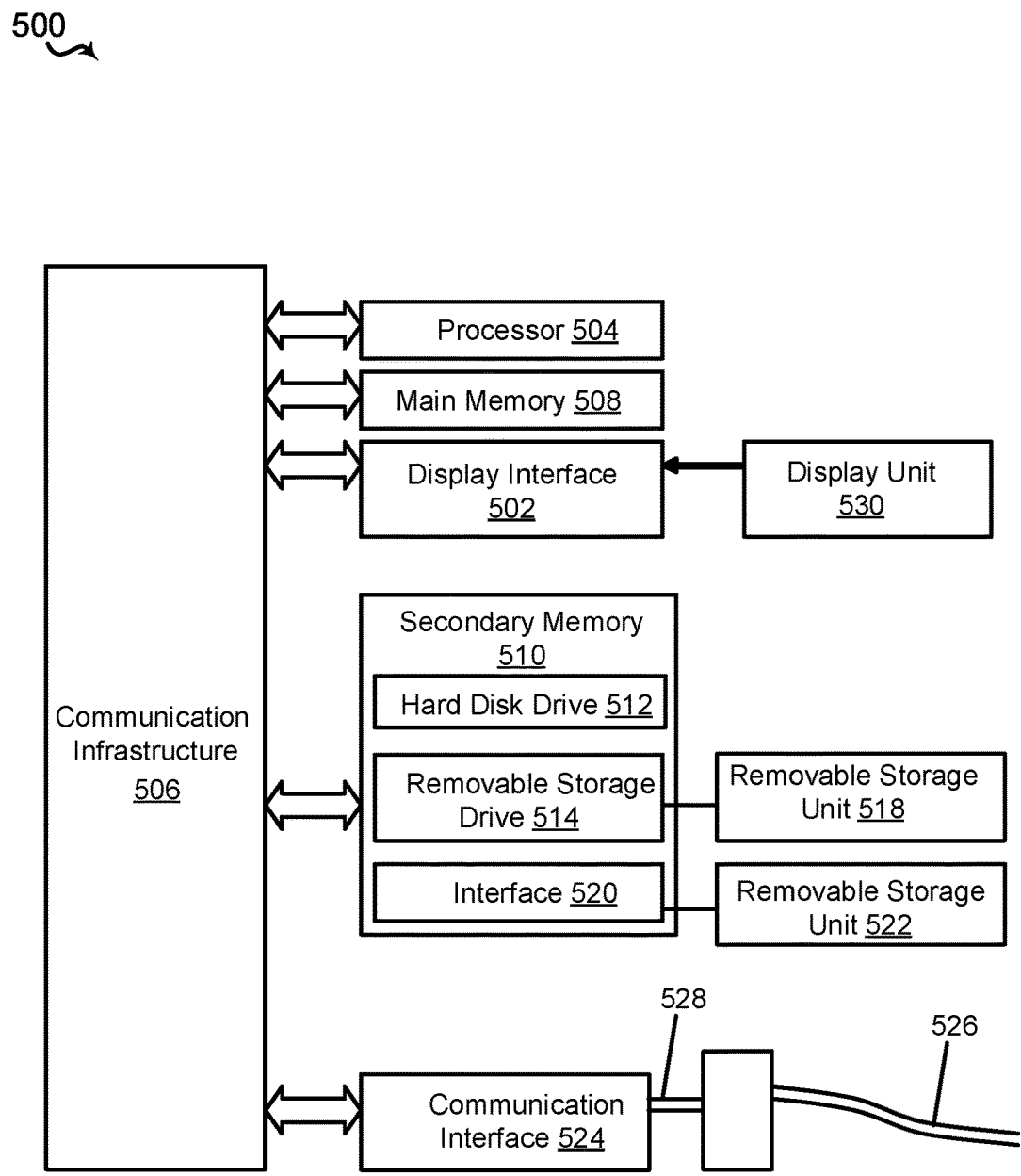
FIG. 5 illustrates an example of a computer system in accordance with aspects of the present disclosure.

Aspects of the present disclosures, such as the security server 120 and/or the mobile device 130 may be implemented using hardware, software, or a combination thereof and may be implemented in one or more computer systems or other processing systems. In an aspect of the present disclosures, features are directed toward one or more computer systems capable of carrying out the functionality described herein. An example of such a computer system 500 is shown in FIG. 5. The security server 120 and/or the mobile device 130 may include some or all of the components of the computer system 500.

The computer system 500 includes one or more processors, such as processor 504. The processor 504 is connected with a communication infrastructure 506 (e.g., a communications bus, cross-over bar, or network). The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. Various software aspects are described in terms of this example computer system. After reading this description, it will become apparent to a person skilled in the relevant art(s) how to implement aspects of the disclosures using other computer systems and/or architectures.

The computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data. In some examples, one or more of the main memory 508, the secondary memory 510, the removable storage unit 518, and/or the removable storage unit 522 may be a non-transitory memory.

Alternative aspects of the present disclosures may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, an RF link and/or other communications channels. In this document, the terms "computer program medium" and "computer usable medium" are used to refer generally to media such as a removable storage drive 518, a hard disk installed in hard disk drive 512, and signals 528. These computer program products provide software to the computer system 500. Aspects of the present disclosures are directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features in accordance with aspects of the present disclosures, as discussed herein. In particular, the computer programs, when executed, enable the processor 504 to perform the features in accordance with aspects of the present disclosures. Accordingly, such computer programs represent controllers of the computer system 500.

In an aspect of the present disclosures where the method is implemented using software, the software may be stored in a computer program product and loaded into computer system 500 using removable storage drive 514, hard drive 512, or communications interface 520. The control logic (software), when executed by the processor 504, causes the processor 504 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media may comprise RAM, ROM, electrically erasable programmable read only memory (EEPROM), compact disk (CD) ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of controlling access, comprising:
   receiving registration information associating a mobile device with an access device, wherein the access device provides an access privilege to an access-controlled point;
   associating the mobile device with the access device;
   receiving a blocking request from the mobile device to suspend the access privilege to the access-controlled point provided by the access device;
   authenticating the blocking request; and
   suspending, in response to authenticating the blocking request, the access privilege to the access-controlled point provided by the access device.

2. The method of claim 1, further comprising transmitting a blocking confirmation to the mobile device in response to suspending the access privilege provided by the access device.

3. The method of claim 1, further comprising, after suspending the access privilege:
   receiving an access request with the access device; and
   alerting security personnel of the access request.

4. The method of claim 1, further comprising:
   receiving an unblocking request from the mobile device to restore the access privilege to the access-controlled point provided by the access device associated with the mobile device;
   authenticating the unblocking request; and
   restoring, in response to authenticating the unblocking request, the access privilege to the access-controlled point provided by the access device.

5. The method of claim 4, further comprising transmitting an unblocking confirmation to the mobile device in response to restoring the access privilege provided by the access device.

6. The method of claim 1, wherein the registration information comprises at least one of hardware information, a phone number, or a subscriber identity module identifier of the mobile device.

7. The method of claim 1, wherein the access device is an access card comprising a magnetic strip or a radio frequency identification tag.

8. An security server, comprising:
   a memory comprising instructions; and
   a processor communicatively coupled with the memory, the processor being configured to execute the instructions to:
      receive registration information associating a mobile device with an access device, wherein the access device provides an access privilege to an access-controlled point;
      associate the mobile device with the access device;
      receive a blocking request from the mobile device to suspend the access privilege to the access-controlled point provided by the access device;
      authenticate the blocking request; and
      suspend, in response to authenticating the blocking request, the access privilege to the access-controlled point provided by the access device.

9. The security server of claim 8, wherein the processor is further configured to transmit a blocking confirmation to the mobile device in response to suspending the access privilege provided by the access device.

10. The security server of claim 8, wherein the processor is further configured to, after suspending the access privilege:
    receive an access request with the access device; and
    alert security personnel of the access request.

11. The security server of claim 8, wherein the processor is further configured to:
    receive an unblocking request from the mobile device to restore the access privilege to the access-controlled point provided by the access device associated with the mobile device;
    authenticate the unblocking request; and
    restore, in response to authenticating the unblocking request, the access privilege to the access-controlled point provided by the access device.

12. The security server of claim 11, wherein the processor is further configured to transmit an unblocking confirmation to the mobile device in response to restoring the access privilege provided by the access device.

13. The security server of claim 8, wherein the registration information comprises at least one of hardware information, a phone number, or a subscriber identity module identifier of the mobile device.

14. The security server of claim 8, wherein the access device is an access card comprising a magnetic strip or a radio frequency identification tag.

15. A non-transitory computer readable medium comprising instructions that, when executed by a processor, cause the processor to:
receive registration information associating a mobile device with an access device, wherein the access device provides an access privilege to an access-controlled point;
associate the mobile device with the access device;
receive a blocking request from the mobile device to suspend the access privilege to the access-controlled point provided by the access device;
authenticate the blocking request; and
suspend, in response to authenticating the blocking request, the access privilege to the access-controlled point provided by the access device.

16. The non-transitory computer readable medium of claim 14, further comprises instructions that, when executed by the processor, cause the processor to transmit a blocking confirmation to the mobile device in response to suspending the access privilege provided by the access device.

17. The non-transitory computer readable medium of claim 14, further comprises instructions that, when executed by the processor, cause the processor to, after suspending the access privilege:
receive an access request with the access device; and
alert security personnel of the access request.

18. The non-transitory computer readable medium of claim 14, further comprises instructions that, when executed by the processor, cause the processor to:
receive an unblocking request from the mobile device to restore the access privilege to the access-controlled point provided by the access device associated with the mobile device;
authenticate the unblocking request; and
restore, in response to authenticating the unblocking request, the access privilege to the access-controlled point provided by the access device.

19. The non-transitory computer readable medium of claim 18, further comprises instructions that, when executed by the processor, cause the processor to transmit an unblocking confirmation to the mobile device in response to restoring the access privilege provided by the access device.

20. The non-transitory computer readable medium of claim 14, wherein the access device is an access card comprising a magnetic strip or a radio frequency identification tag.

* * * * *

UNITED STATES PATENT AND TRADEMARK OFFICE
CERTIFICATE OF CORRECTION

PATENT NO. : 10,748,364 B1
APPLICATION NO. : 16/513286
DATED : August 18, 2020
INVENTOR(S) : Kulshrestha et al.

Page 1 of 1

It is certified that error appears in the above-identified patent and that said Letters Patent is hereby corrected as shown below:

In the Specification

In Column 2, Line 8, delete "device" and insert -- device. --, therefor.
In Column 3, Line 46, delete "an holder" and insert -- a holder --, therefor.
In Column 9, Line 54, delete "removable storage drive 518," and insert -- removable storage drive 514, --, therefor.

In the Claims

In Column 12, Line 30, in Claim 8, delete "An security" and insert -- A security --, therefor.

Signed and Sealed this
First Day of December, 2020

Andrei Iancu
*Director of the United States Patent and Trademark Office*